[11] 3,569,836

[72] Inventor Glen W. Deen
Richardson, Tex.
[21] Appl. No. 745,275
[22] Filed July 16, 1968
[45] Patented Mar. 9, 1971
[73] Assignee Collins Radio Company
Dallas, Tex.

[54] METHOD OF REDUCING SIGNAL DISTORTION AND IMPROVING OPERATING EFFICIENCY BY SELECTIVELY SHIFTING PARASITIC RESONANT FREQUENCIES AWAY FROM HARMONICS OF OPERATING FREQUENCY
3 Claims, 5 Drawing Figs.

[52] U.S. Cl. .......... 325/123, 325/127, 328/162, 330/196
[51] Int. Cl. .......... H03f 1/32
[50] Field of Search .......... 325/123, 124.65, 127, 128, 171, 172, 65; 328/167, 165, 162; 330/196, 195, 192, 149

[56] References Cited
UNITED STATES PATENTS

| | | | |
|---|---|---|---|
| 1,485,111 | 2/1924 | Bethnod .......... | 325/124X |
| 1,768,418 | 6/1930 | Oswald et al. .......... | 330/192X |
| 2,284,181 | 5/1942 | Usselman .......... | 330/196 |
| 2,467,736 | 4/1949 | George .......... | 328/165X |
| 2,855,508 | 10/1958 | Barlow et al. .......... | 325/172X |
| 3,212,022 | 10/1965 | Tadama .......... | 330/61 |

OTHER REFERENCES
The Radio Amateurs Handbook: 1963; pp 560— 561

*Primary Examiner*—Robert L. Griffin
*Assistant Examiner*—Benedict V. Safourek
*Attorneys*—Henry K. Woodward and Robert J. Crawford

ABSTRACT: Operating efficiency of a high power radio transmitter is improved by selectively shifting the parasitic resonant frequency in the output network as a function of transmitter operating frequency. Inductance means is switchably inserted in the output network to accomplish the shift in parasitic resonant frequency.

INVENTOR.
GLEN W. DEEN
BY Henry K. Woodward
ATTORNEY

PATENTED MAR 9 1971 3,569,836

INVENTOR.
GLEN W. DEEN
BY Henry K. Woodward
ATTORNEY

INVENTOR.
GLEN W. DEEN
BY Henry K. Woodward
ATTORNEY

METHOD OF REDUCING SIGNAL DISTORTION AND IMPROVING OPERATING EFFICIENCY BY SELECTIVELY SHIFTING PARASITIC RESONANT FREQUENCIES AWAY FROM HARMONICS OF OPERATING FREQUENCY

This invention relates generally to radio transmitters and more particularly to the power output portion of such transmitters and methods and means for limiting the detrimental effects of parasitic resonances therein.

Most high frequency radio transmitters have a problem with very high frequency resonances in the power output network which can affect transmitter stability and efficiency. In the VHF range, the output network tank circuit tuning capacitor and the DC blocking capacitor are reactive due to their self-inductances, and this inductance along with the lead inductances in series with the capacitors resonate with the plate output capacity of the power tubes. This VHF parasitic resonance is a function of operating frequency since the capacitance of the tank circuit tuning capacitor varies with operating frequency, and this change in capacitance has a small but noticeable effect at very high frequencies.

In low power transmitters parasitic resonance occurs near higher order harmonics of the operating frequency, and the problem is minimized through use of parasitic suppressors which function as absorptive filters for the harmonics. However, such parasitic suppressors are impractical in high power transmitters since relatively large amounts of energy may be present in the harmonics. Not only is the transmitter operating with higher power, but also the parasitic resonance occurs near lower order harmonics which have greater energy content than higher order harmonics. The lower parasitic resonant frequency is due to the comparatively large physical size, and greater self-inductance, of the tuning and blocking capacitors of high power transmitters and also the larger plate output capacity. Consequently, the effects of parasitic resonance is particularly acute in high power transmitters.

An object of this invention is a method of avoiding the detrimental effects of parasitic resonances in the power output network of a high power radio transmitter.

Another object of the invention is circuit means for selectively altering the parasitic resonant frequency of a radio transmitter.

Still another object of the invention is a radio transmitter with improved operating efficiency over a relatively wide frequency range.

These and other objects and features of the invention will be apparent from the following description and appended claims.

Briefly, in accordance with the invention, the parasitic resonant frequency for a particular transmitter is determined as a function of operating frequency and where a harmonic of the operating frequency falls on or near the parasitic resonant frequency, the parasitic resonant frequency is altered by adjusting circuit parameters. Preferably, a radio transmitter having an output network including power amplifying means for amplifying an RF signal and filter means operatively connected to receive and pass RF signals from the power amplifying means to antenna means is provided with an inductance means of such a size as to alter significantly the parasitic resonant frequency of the power output proportion while being insignificant at the radio operating frequency. Switch means is provided to selectively insert said reactive element into said filter means at various operating frequencies.

The invention will be more fully understood from the following detailed description and appended claims when taken with the drawings, in which:

Figure 4:
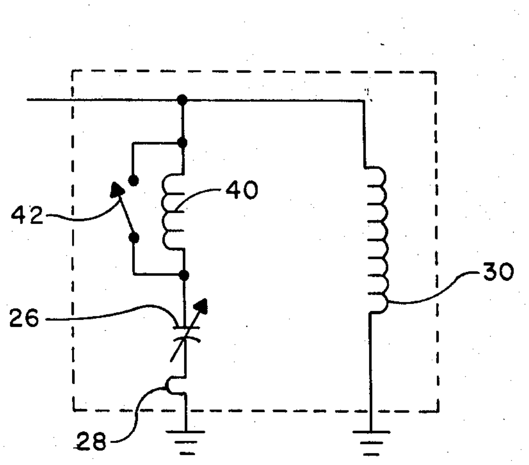
Figure 3A:
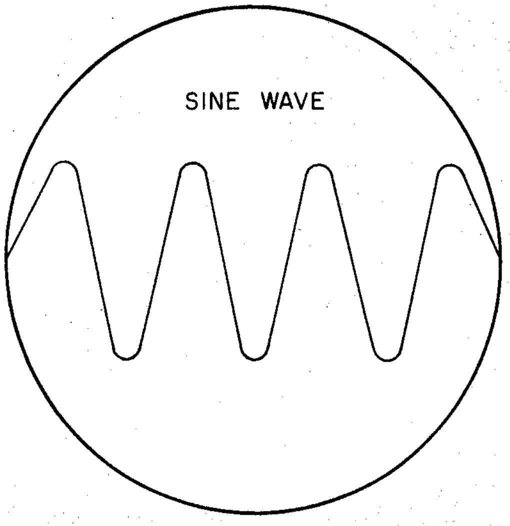
Figure 3B:
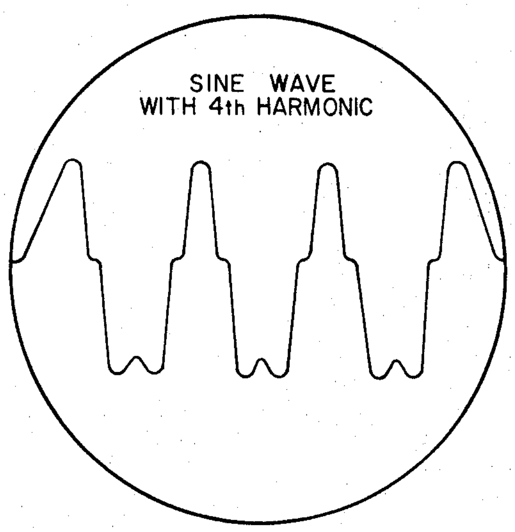

FIGS. 3*a* and 3*b* are curves of desired plate voltage and actual plate voltage illustrating the effects of parasitic resonance; and FIG. 4 is one embodiment of a tuned circuit in accordance with the invention in the output network of a radio transmitter.

Figure 1:
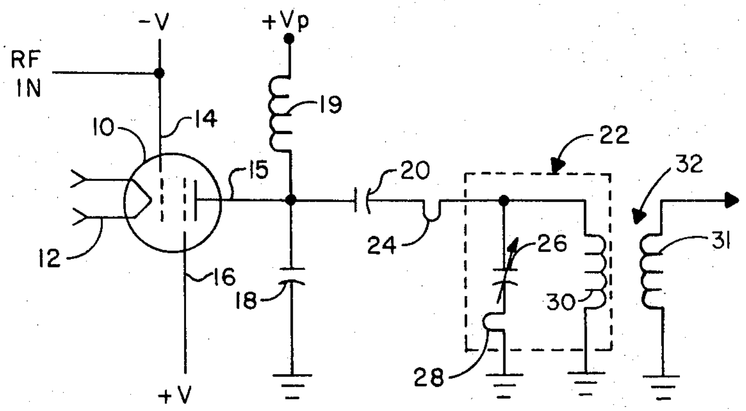
FIG. 1 is a schematic circuit diagram of the power output network of a radio transmitter.

Referring now to the drawings, FIG. 1 is a schematic circuit diagram of the plate circuit in the output network of a high power, high frequency radio transmitter. Typically, the tube 10 is tetrode power amplifier tube and the transmitter may include one or two such tubes, connected in parallel. In one embodiment of a transmitter operating in the high frequency range of about 3 to 30 megahertz with a power of 250 kilowatts, the tubes are Eimac 4CV100,000 vapor cooled tetrodes. Filament potential is applied to the cathode 12, the RF input signal is applied to the control grid 14, and the power output is taken at the plate 15. The control grid 14 is biased negatively, the screen grid 16 is biased positively, and the DC potential, +Vp, is connected through an RF choke 19 to the plate 15. Capacitor 18 is the inherent plate-to-ground capacitance, along with the peripheral tube capacitance such as the boiler capacitance of the Eimac tetrode. Typically, capacitor 18 is of the order of 250 picofarads. Capacitor 20 is a DC blocking capacitor of about 2000 picofarads and connects the RF output at plate 15 to the tuned tank circuit indicated generally at 22. Blocking capacitor 20 has a small amount of self-inductance, of the order of 0.03 microhenries, which is represented by inductor 24 in series with capacitor 20. Inductor 24 is relatively insignificant in the high frequency range, but contributes to the parasitic resonant frequency problem at very high frequencies.

Tuned circuit 22 comprises a variable capacitor 26, having a self-inductance 28, which is in parallel with coil 30, the primary of the output transformer 32. Conventionally, the output of the secondary coil 31 of transformer 32 is passed through low pass and/or band pass filters to the transmitter antenna (not shown).

At the operating frequency of an HF transmitter, between 3 and 30 megahertz, the reactances of self-inductances 24 and 28 of capacitors 20 and 26, respectively, are relatively insignificant and can be neglected. However, at the parasitic resonant frequency, which may be from two to eight times higher than the operating frequency, the inductive reactances of the capacitors are significant. At this frequency, the capacitive reactances of the capacitors are much lower than the inductive reactances, and the net inductive reactance resonants with the plate output capacity 18.

Figure 2:
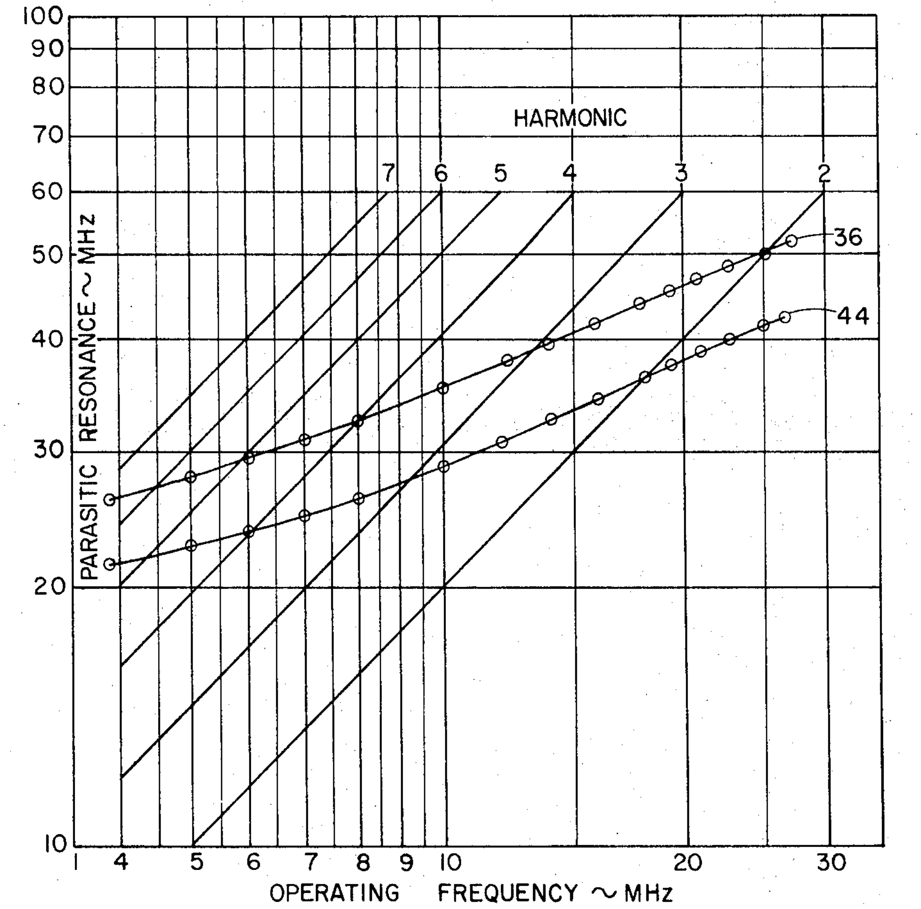
FIG. 2 is a graph illustrating the parasitic resonant frequency versus operating frequency for one particular high frequency transmitter.

FIG. 2 is a graph illustrating the parasitic resonant frequency versus operating frequency for one particular high frequency transmitter. As above noted, the transmitter is operated between 3 and 30 megahertz, as indicated on the graph abscissa, and the parasitic resonant frequency line 36 lies between 20 and 60 megahertz, which is measured along the ordinate axis. The graph also includes the harmonics of the operating frequency, as indicated.

The parasitic resonance is acute where a harmonic of the operating frequency is on or near the parasitic resonant frequency line. For example, in FIG. 2 it will be noted that the fourth harmonic of an 8 megahertz operating frequency falls on parasitic resonant frequency line 36. FIGS. 3*a* and 3*b* are the desired plate voltage waveform of an 8 megahertz transmitter and the actual waveform, respectively, under these conditions. In FIG. 3*b*, the fourth harmonic distortion is clearly evident as ripples on the desired waveform. This results in reduced transmitter efficiency since the final amplifier tubes deliver power at the fourth harmonic frequency as well as the desired fundamental frequency.

An effective method of improving transmitter efficiency by reducing the plate voltage distortion is by selectively altering circuit parameters and thereby changing the parasitic resonant frequency of the output network of the transmitter. Varying any of the reactive elements in the output network will affect the parasitic resonant frequency but usually with some undesirable side effect. For example, switching a small fixed capacitor in parallel with the plate output capacity 18 of FIG. 1 will lower the parasitic resonant frequency at lower frequencies but increase the parasitic resonant frequency at higher frequencies because capacitor 26 must retune to compensate for this change. This does not give the desired uniform degree of control of the parasitic resonance over the entire operating frequency range. Alternatively, a change in tank inductor 30 will force a change in variable tuning capacitor 26 and therefore alter the parasitic resonant frequency. However, this is effective only at higher operating frequencies since the capacitance of capacitor 26 has little influence on the parasitic resonant frequency at the lower operating frequencies. Further, changing the value of the DC blocking capacitor 20 will shift the VHF parasitic resonant frequency. Generally, the capacitance of this capacitor is much greater than the plate output capacity 18, and its influence on the frequency of the parasitic resonance will be correspondingly small. If the value of the DC blocking capacitor 20 is reduced to a value comparable to the plate output capacity 18, the parallel resistance, and voltage, across the tank circuit is greatly increased. In a high power transmitter the increased tank voltage would necessitate a more expensive tuning capacitor to prevent failure due to voltage breakdown. Also, unless the tank reactance were increased, the loaded tank quality factor, Q, would greatly increase thereby causing excessive losses and reduced efficiency. On the other hand, placing a small inductor in series with the blocking capacitor, while significantly shifting the VHF parasitic resonance, reduces the loaded tank quality factor which reduces harmonic filtering action.

A particularly advantageous method of shifting the parasitic resonant frequency in accordance with the invention includes switchably inserting an inductance means in series with the tuning capacitor in the tank circuit. FIG. 4 is a schematic circuit diagram of the tank circuit portion 22 of the circuit illustrated in FIG. 1 and includes a small inductor 40 connected serially with variable capacitor 26 and the self-inductance 28 thereof. While inductor 40 is of the order of only 0.06 microhenry, it is sufficient to lower the parasitic resonant frequency by about 17 percent as illustrated by curve 44 in FIG. 2. Thus, when a harmonic of an operating frequency falls on or near the parasitic resonant frequency of the output portion of the transmitter, switch 42 is opened thereby inserting inductor 40 in series with variable capacitor 26 and thereby allowing the parasitic resonant frequency to dodge the harmonic frequency. For example, as indicated above, the fourth harmonic of an operating frequency of 8 megahertz falls on the parasitic resonant frequency line 36 in FIG. 2, but insertion of inductor 40 into the circuit reduces the parasitic resonant frequency from 32 megahertz to 27 megahertz, thereby avoiding the fourth harmonic. On the other hand, at an operating frequency of 18 megahertz, the normal parasitic resonant frequency line 36 lies between the second and third harmonics of the operating frequency while curve 44 falls on the second harmonic thereof. Accordingly, at this operating frequency, switch 42 remains closed, thereby removing inductor 40 from the circuit. At lower operating frequencies, 6 megahertz for example, it is seen that harmonics fall on or near both curves 36 and 44. Since the higher harmonics contain less energy than lower harmonics, it is preferable to keep switch 42 closed and thereby allow only the higher harmonic to develop in the circuit.

By examining the curves for the various operating frequencies for the particular transmitter, a scheme for opening and closing switch 42 is developed. An analysis of the harmonics in the graph of FIG. 2 yields the following scheme for opening and closing switch 42 for the particular transmitter under consideration:

| Frequency Range | Switch 42 |
|---|---|
| 3.950 to 6.999 MHz | Closed |
| 7.000 to 8.499 MHz | Open |
| 8.500 to 10.499 MHz | Closed |
| 10.500 to 13.999 MHz | Open |
| 14.000 to 19.999 MHz | Closed |
| 20.000 to 26.500 MHz | Open |

Thus, as the operating frequency of the transmitter is changed during the day due to ionospheric conditions, for example, switch 42 will be opened or closed according to the developed switch scheme. In more elaborate transmitter stations where operation is controlled by computer, the desired operating frequency and condition for switch 42 can be preprogrammed.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

I claim:

1. The method of improving the operating efficiency by reducing signal distortion in a radio transmitter comprising the steps of determining the parasitic resonant frequency of the output network of said radio transmitter as a function of transmitter operating frequency, determining the proximity of said parasitic resonant frequency to a harmonic of said operating frequency, and selectively altering the parasitic resonant frequency to avoid harmonics of said operating frequency.

2. The method defined by claim 1 wherein the step of selectively altering the parasitic resonant frequency includes the step of inserting an inductive reactance means into said output network.

3. The method defined by claim 2 wherein said inductive reactance means is switchably insertable in a resonant circuit of said output portion.